United States Patent [19]
Fukuda

[11] Patent Number: 5,908,377
[45] Date of Patent: *Jun. 1, 1999

[54] METHOD OF SOLIDIFYING LIQUID OILS

[76] Inventor: Tomoyuki Fukuda, 1-7, Sinohara-cho, Kurume-shi, Fukuoka 830, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/704,630

[22] PCT Filed: Jan. 25, 1996

[86] PCT No.: PCT/JP96/00142

§ 371 Date: Sep. 4, 1996

§ 102(e) Date: Sep. 4, 1996

[87] PCT Pub. No.: WO96/23846

PCT Pub. Date: Aug. 8, 1996

[30] Foreign Application Priority Data

Jan. 30, 1995 [JP] Japan .................................. 7-034524
Feb. 15, 1995 [JP] Japan .................................. 7-050416

[51] Int. Cl.⁶ ........................................... C09K 3/32
[52] U.S. Cl. .................... 516/102; 516/105; 516/108; 516/109; 588/201; 588/252; 588/901
[58] Field of Search .................... 252/315.1; 588/201, 588/901, 252; 516/102, 105, 108, 109

[56] References Cited

U.S. PATENT DOCUMENTS

| | | | |
|---|---|---|---|
| 3,969,087 | 7/1976 | Saito et al. ............................. | 252/316 |
| 4,933,525 | 6/1990 | St. Phillips ........................... | 219/10.55 |
| 5,429,230 | 7/1995 | Hodakowski et al. ................. | 252/315.1 |

FOREIGN PATENT DOCUMENTS

| | | |
|---|---|---|
| 55-106298 | 8/1980 | Japan . |
| 61-19681 | 1/1986 | Japan . |
| 4-227691 | 8/1992 | Japan . |
| 6-073366 | 3/1994 | Japan . |
| 6-73366 | 3/1994 | Japan . |
| 7-26246 | 1/1995 | Japan . |
| 8-127797 | 5/1996 | Japan . |

OTHER PUBLICATIONS

PTO 98–1479, Feb. 4, 1998, Translation JP 61–019,681 A.
PTO 98–1430, Feb. 1998, Translation JP 06–073366 A.
PTO 98–1419, Feb. 1998, Translation JP 04–227691 A.
The Merck Index an Encyclopedia of Chemicals, Drugs, and Biologicals, Tenth Edition, edited by Martha Windholz (Merck & Co., Inc., Copyright 1983) pp. 979–980, entry 6706, Jan. 1984.
Database WPAT on Questel, week 9415, London: Derwent Publications Ltd., AN 94–124252/15, JP06073366 A(Lion Corp.) abstract, Mar. 1994.
Database WPAT on Questel, week 9239, London: Derwent Publications Ltd., AN 92–320965/39, JP04227691 A (Lion Corp.) abstract, Aug. 1992.
Database WPIDS on STN, Week 8140, London: Derwent Publications Ltd., AN 81–72593D, JP 56103273 A, (Taguma Sogo Kenkyusho) abstract, Aug. 1981.
Database WPIDS on STN, Week 8610, London: Derwent Publications Ltd., AN 86–066565, JP 61019681 A (New Japan Chem Co Ltd.) abstract, 1986.
Database WPIDS on STN, week 9514, London: Derwent Publications Ltd., AN 95–102155, JP 07026246 A, (Nisshin Oil Mills Ltd.), abstract, 1995.

*Primary Examiner*—Richard D. Lovering
*Assistant Examiner*—Daniel S. Metzmaier
*Attorney, Agent, or Firm*—Armstrong, Westerman, Hattori, McLeland & Naughton

[57] ABSTRACT

A method of solidifying a liquid oil without heating the liquid oil. The method utilizes a solidifying agent for liquid oil which includes a gel-in-oil forming material (I) and a temporarily protective material (II) for the gel forming material (I), the solidifying agent sealed in a heat resistive container being heated as sealed therein and then mixed with the liquid oil.

17 Claims, No Drawings

METHOD OF SOLIDIFYING LIQUID OILS

This application was filed under 35 USC §371 and is based on PCT/JP96/00142, filed Jan. 25, 1996.

BACKGROUND ARTS

The present invention relates to a method of solidifying liquid oils and a solidifying agent. More particularly, the present invention relates to the method of solidifying rapidly and easily waste oils such as used waste edible oils or waste engine oils of cars without heating and to the solidifying agent used therefore.

In recent years, water pollution of drains, rivers, lakes and the like has been a significant social problem from an environmental aspect and, among them, it is said that throwing away the used edible oils from general homes into drains is one of major causes for the pollution due to oils.

The used waste edible oils, if little, have been treated as inflammable trash after being absorbed into newspapers, cloths and the like. In case where an amount of the waste oils is large, however, since it is difficult to treat the waste oils by means of the absorption method, various kinds of methods of solidification-treatment of the waste oils with a gelling agent have been proposed in recent years. Though a certain method of those methods has already been commercialized (the following method (2)), it has not yet been spreaded sufficiently because problems such that it takes a long period of time to solidify the waste oils and that there is a danger of a fire caused by oil are not yet solved.

As the method of treatment by using the gelling agent, there are known a method (1) wherein a solidification-treating agent containing, as a main ingredient, a natural wax, a synthetic wax, a solid higher fatty acid, a solid higher alcohol or a resin having a melting point of not higher than 150° C. is used for the solidification-treatment (JP-A-112385/1979), a method (2) wherein waste edible oils are solidified by adding 12-hydroxystearic acid to the waste edible oils, heating to dissolve the acid, and then cooling (JP-A-106298/1980), a method (3) wherein there is used a solidification-treating agent for disposal of waste edible oils containing a combination of 12-hydroxystearic acid and a small amount of a higher fatty acid having 16 to 24 carbon atoms or dibenzylidene sorbitol and a nuclear-substituted compound thereof as effective components (JP-A-19681/1986), a method (4) wherein waste edible oils are solidified by adding a solution of 12-hydroxystearic acid dissolved in a polar solvent such as dimethyl sulfoxide, N-methylpyrrolidone or ethyl alcohol to the waste edible oils and mixing them, and then bringing the obtained admixture into contact with water (JP-A-90599/1988), a method (5) wherein liquid oils are gelled by adding boric acid or a borate after the liquid oils are emulsified by adding a water-soluble macromolecular compound having hydroxyl group and water (JP-A-122796/1992), and the like.

Each of the above-mentioned methods (1) to (3) is, however, to solidify the waste oils by heating up to at least 80° C. to dissolve the gelling agent therein and then cooling, and is neither economical nor efficient because a large energy and long time are required for heating and cooling the waste oils. Further, these methods have many problems such that there is a danger of getting scalded if the heated waste oils of high temperature are spilled, that there is a fear of a fire to be caused by heating the waste oils too high, and that bad smell due to deterioration of the waste oils are generated during the heating. Particularly, in case where the amount of oil is about four liters like waste engine oil from a car and is several times larger than that of the waste edible oil generated in the general home, a danger of scalding and fire is further increased. Therefore, it cannot be recommended in view of safety to carry out the solidification-treatment of the waste engine oils (hereinafter abbreviated simply to "waste-oil-treatment") at general homes according to methods (1) to (3). The method (4) is different from methods (1) to (3) and is recognized to be advantageous in that the treatment of the waste oils can be carried out without heating. There is a problem, however, in safety in such a procedure that, because a gelling agent dissolved in the highly inflammable solvent is used, potential danger of a fire is higher than in the methods (1) to (3). Further, a new waste water which contains solvents and oils is generated and treatment thereof is also burdensome, which results in the treatment being inefficient. Therefore, method (4) is not suitable for the waste-oil-treatment at general homes and food service fields such as restaurants, fast food shops and food supply centers because few possess chemical knowledge.

Method (5) is to solidify water and at the same time trap the oils in the obtained hydrogel body, and is technically different from methods (1) to (4). Method (5) is inefficient in that in such a procedure the amount of disposal to be treated increases because almost the same amount of water as that of oils is necessary, and has a disadvantage in that the solidified product is more difficult to burn than in methods (1) to (4) when incinerated because the solidified product contains a large amount of water.

As described above, each of the methods (1) to (5) has difficulties in efficiency, safety and the like in the waste-oil-treatment and, particularly, cannot be said to be suitable as a method of treating the waste edible oil in general homes.

Further, in general homes, deterioration of qualities such as the hue or viscosity of the edible oil to be used is often noticed just before cooking and it is impossible to take 30 or more minutes for treating (heating and cooling) the waste edible oil as in the methods (1) to (3) by interrupting the cooking. Also, it is assumed that causes that the delay in the spread of the above-mentioned methods lie in technically unsatisfactory aspects such that the hardness of the solidified product changes (is fluid in some cases) every time when waste oils are treated because the amount of the waste edible oil generated from a general home is not always the same and that the hardness of the solidified product cannot be known until 20 or more minutes (until cooled to approximately 40° C.) passes after completion of the heat treatment of the waste oils. From those circumstances, an easy and safe method capable of solidification-treating waste edible oil in a short period of time without heating has been eagerly awaited.

As a method of solidifying waste edible oils and the like without heating, a method (6) is disclosed in JP-A-26246/1995 wherein a composition for treating the waste oils, which contains an oily gelling agent (first component) such as 12-hydroxystearic acid and a low volatile component (second component) which can be heated by electromagnetic energy and facilitates dissolution of the gelling agent into oil, is subjected, alone or after brought into contact with the waste oil beforehand, to heating and melting by providing electromagnetic energy to be dissolved in the waste oil and then allowed to stand. Examples of the second component are bivalent and trivalent polyol, carbitol, butylcarbitol and the like and, particularly preferable are, glycols such as propylene glycol, dipropylene glycol, tripropylene glycol, butylene glycol, hexylene glycol, octylene glycol and polyethylene glycol, and, further, propylene glycol is most preferable in view of safety of food.

Each of the above-exemplified compounds is, however, included in a category of solvent, for example, as entered in "Shinpan Yozai Pocket Book" (by Yuki Gosei Kagaku Kyokai, published by Oohm Sha Kabushiki Kaisha on June, 1994) and the flashing point thereof, except polyethylene glycol, is in a range of 78° to 140° C. (flashing point of propylene glycol which is the most preferable example is 99° C.). Though each of the compounds has a higher boiling point and lower inflammability as compared with the solvents (dimethyl sulfoxide, N-methylpyrrolidone, ethyl alcohol) used in method (4), the danger of ignition always inherently exits. Therefore, in case where it is assumed that the waste-oil-treatment is carried out in a kitchen where any fire such as gas is always used, even if the composition for the waste-oil-treatment is not directly heated and melted by gas fire, there is a danger that the high temperature composition for the waste-oil-treatment which is heated and melted by another heating means is ignited, which leads to an oil fire. Particularly, the danger of a fire is further increased in such a case where the composition for the waste-oil-treatment is erroneously super-heated.

Though the above-exemplified compounds as the second component are strong in properties as a solvent and, therefore, are superior in capability of dissolving the oily gelling agent (first component) and easy to use, there is a disadvantage that only a solidified product having a relatively low gelling strength can be obtained since a part of the oily gelling agent is still dissolved even after the waste-oil-treatment. In order to produce a solidified product having a high gelling strength, somewhat a large amount of the oily gelling agent (first component) must be used, which leads to an increase cost. With respect to polyethylene glycol, because there is no hydrophobic group in its molecule and the composition for the waste-oil-treatment is not dispersed uniformly in the waste oil, many small lumps of disorderly solidified product are generated in the system and a homogeneously solidified product cannot be obtained.

Also, with respect to a method of preparing the composition for the waste-oil-treatment there is simply described the mixing of components. And, with respect to the method for heating and melting the composition for the waste-oil-treatment, there is described the internal heating by providing electromagnetic energy, though it is not clear whether or not it is for avoiding the above-mentioned problem of ignition. There is described, concretely, a method of heating the gelling agent by means of a microwave oven just before the addition to the waste oils (method 6A), or a method of heating the gelling agent together with the waste oils after the addition (method 6B). Though the heating method 6A by means of the microwave oven is easy to operate, super-heating results in not only the above-mentioned danger of a fire but also unexpected scald, and deterioration of the second component occurs and odor is generated. On the contrary, insufficient heating brings about solidification failure. Therefore, to carry out the waste-oil-treatment safely and surely, it is necessary to change the amount of the composition for the waste-oil-treatment and the heating time of the microwave oven according to the amount and temperature of the waste oils to be treated. It is not possible to expect that housewives of general homes, who have poor chemical knowledge, can be entrusted with such a troublesome task. Also, though it is recognized that the consumption of energy required for the heating in the method 6B is smaller than that in the conventional methods (1) to (3) of heat-treating the waste oils, method 6B is not different from the conventional methods (1) to (3) in such a point that the waste oils are heated. Though there is a description with respect to a heat- and oil-resistive container such as a frying pan which is used for the waste-oil-treatment, there is no description with respect to a container for the composition for the waste-oil-treatment.

The present invention has been completed on the basis of the above-mentioned backgrounds, and the object thereof is to provide a method of solidifying waste oils safely and surely in a short period of time without heating the waste oils and to provide a solidifying agent which can be used with a broad range of compositions.

SUMMARY OF THE INVENTION

The inventor has made intensive studies with respect to the theory to solidify liquid oils of ordinary temperature (about 20° C.) in a short period of time they have found that if a heated and melted gel-in-oil forming material (also called as a gelling agent in oil, and hereinafter referred to as "a gel forming material") is simply added to the liquid oils of ordinary temperature and mixed, the whole system is not solidified homogeneously and only phenomenon of local solidification (namely, in the form of small lumps of disorderly solidified oils) can be seen. However, if the gel forming material is protected temporarily so as to be not brought into contact with the liquid oils for a short period of time (several seconds to several minutes) until the gel forming material is finely dispersed uniformly in the liquid oils after mixing, the gel forming material in the molten state which is covered with the temporarily protective material leaves the protective material and diffuses (dissolves) uniformly into the liquid oils. Thus, the whole system is homogeneously and firmly solidified according to a succeeding rapid phase transition (crystallization) of the gel forming material from liquid phase to solid phase. Further, as a result of the inventor's repeated research with respect to the method, whereby even housewives can do solidification-treatment of waste edible oils in a short period of time, easily, safely and surely, the present inventor found the fact that if the specific solidifying agent is heated and melted in the state as sealed in a heat-resistive container, the solidifying agent is not ignited and the danger of a fire can be avoided and, further, the fact that a homogeneously solidified product can be obtained, and then has reached the present invention.

Namely, the present invention is a method of solidifying liquid oils characterized in that a liquid-oil-solidifying agent (Z) which comprises the gel-in-oil forming material (I) and a temporarily protective material (II) for (I) and is sealed in a heat-resistive container, is heated as sealed in the container and then all or a part of the molten liquid-oil-solidifying agent (Z) is mixed with the liquid oils so as to solidify the liquid oils.

Also, the present invention relates to the liquid-oil-solidifying agent (Z) which is obtained by heating and melting the gel-in-oil forming material (I) and the temporarily protective material (II) to substantially remove substances having a low boiling point, and then cooling.

BEST MODE FOR CARRYING OUT THE INVENTION

In the solidifying agent (Z) of the present invention, as the gel forming material (I) which is the gel-in-oil forming agent component, there are, for example, hydroxy fatty acids (Ia) having 16 to 30 carbon atoms such as 3-hydroxymyristic acid, 10-hydroxystearic acid, 12-hydroxystearic acid and 8,10-dihydroxyoctadecanoic acid, dibenzylidene sorbitol and derivatives thereof (Ib), N-acylamino acid derivatives (Ic) such as lauroylglutamic acid dibutylamide and dicaproyllisine laurylamide, and the like. There may be used a combination of at least two of these compounds.

Among these compounds, the hydroxy fatty acid (Ia) is preferable and, particularly, 12-hydroxystearic acid is most preferable from such a point that it has a low melting point of about 75° C. and is easy to handle and relatively cheap.

In the present invention, the role of the temporarily protective material (II) for the gel forming material (I) is, as described above, to delay temporarily the contact of the gel forming material (I) with the liquid oils in molecular level until both are admixed to each other almost completely and, in other words, to delay temporarily phase transition of the gel forming material from liquid phase to solid phase. Examples of the materials (II) playing such a role are compounds which have miscibility with the gel forming material (I) in the molten state, higher affinity to the gel forming material than to the liquid oils to be solidified and, a further, higher hydrophilic property as compared with the liquid oils, and particularly, are compounds having in the molecule thereof, at least one selected from hydrophilic groups such as hydroxyl, carboxyl and oxyethylene.

Also, as described hereinafter, the solidifying agent (Z) of the present invention is used for the solidification of the liquid oils after being heated and melted, in the state as sealed in the heat-resistive container, at a temperature lower than the boiling point of the temporarily protective material (II), of course, lower than the boiling point of the gel forming material (I), for example, at 60° to 180° C. Therefore, there is no danger of ignition so far as the heat-resistive container is not exploded during the heating and it is important that the boiling point of the temporarily protective material (II) which is a component of the solidifying agent (Z) is, for example, higher than 180° C. so that the heat-resistive container is not exploded. Examples of such compounds are as in the following.

(IIa) Hydroxyl-containing Compound (A) Monohydric Alcohol (A-1) aliphatic alcohol having 8 to 16 carbon atoms such as octyl alcohol, nonyl alcohol, decyl alcohol, lauryl alcohol, tridecyl alcohol, myristyl alcohol, pentadecyl alcohol or cetyl alcohol; (A-2) aromatic ring-containing alcohol having 7 to 20 carbon atoms such as benzyl alcohol or cinnamyl alcohol; (A-3) heterocyclic alcohol having 8 to 20 carbon atoms such as 2-isopropyl-4-hydroxymethyl-1,3-dioxolane; and the like.

(B) Polyhydric Alcohol (B-1) alkylene glycol having 3 to 16 carbon atoms such as propylene glycol, trimethylene glycol, butanediol, pentanediol, hexanediol, heptanediol, octanediol, nonanediol, decanediol or pinacol; (B-2) alicyclic glycol having 5 to 16 carbon atoms such as cyclopentanediol or cyclohexanediol; (B-3) aromatic ring-containing glycol having 8 to 20 carbon atoms such as hydrobenzoin; (B-4) aliphatic polyhydric alcohol such as trimethylolpropane, trimethylolethane, hexanetriol or 1,2,3,6-hexanetetrol; and the like.

(C) Phenolic Compound (C-1) monohydric phenol having 6 to 30 carbon atoms such as phenol, cresol, ethylphenol, propylphenol, butylphenol, octylphenol, nonylphenol, nonylcresol, isopropenylphenol, styrenated phenol, xylenol or dinonylphenol; (C-2) dihydric phenol such as bisphenol A or bisphenol F; and the like.

(D) Alkylene Oxide Adduct

Compound prepared by adding at least one mole of at least one of alkylene (having 2 to 4 carbon atoms) oxides such as ethylene oxide, propylene oxide and butylene oxide to one mole of an active hydrogen-containing compound (starting material) having in its molecule at least one functional group such as hydroxyl (—OH), carboxyl (—COOH), primary amino group (—NH$_2$), secondary amino group (=NH) or amide (—CONH$_2$); such as (D-1) compound having one hydroxyl group, (D-2) compound having two hydroxyl groups, and (D-3) compound having three or more hydroxyl groups in its molecule.

Examples of the above-mentioned starting material are, for instance, the following compounds.

(i) Monohydric Alcohol

Aliphatic alcohol having 1 to 25 carbon atoms such as methyl alcohol, ethyl alcohol, propyl alcohol, butyl alcohol, amyl alcohol, hexyl alcohol, heptyl alcohol, octyl alcohol, nonyl alcohol, decyl alcohol, lauryl alcohol, tridecyl alcohol, myristyl alcohol, pentadecyl alcohol, cetyl alcohol or stearyl alcohol; aromatic ring-containing alcohol having 7 to 20 carbon atoms such as benzyl alcohol or cinnamyl alcohol; heterocyclic alcohol having 5 to 20 carbon atoms such as furfuryl alcohol or 2-isopropyl-4-hydroxymethyl 1,3-dioxolane; and the like.

(ii) Polyhydric Alcohol

The above-mentioned polyhydric alcohol (B); tri- to octahydric aliphatic alcohol such as diglycerin, pentaerythritol, sorbitol, glucose, mannitol, xylitol or sucrose; and the like.

(iii) Phenol

The above-mentioned phenolic compound (C); polyhydric phenol such as novolak resin or resol resin; and the like.

(iv) Monocarboxylic Acid

Acetic acid, propionic acid, the carboxylic acid compound (E) described hereinafter; and the like.

(v) Polycarboxylic Acid

Aliphatic saturated dicarboxylic acid having 3 to 12 carbon atoms such as malonic acid, succinic acid, glutaric acid, adipic acid, pimelic acid, suberic acid, azelaic acid or sebacic acid; aliphatic unsaturated dicarboxylic acid having 4 to 12 carbon atoms such as maleic acid, fumaric acid or itaconic acid; aromatic polycarboxylic acid having 8 to 15 carbon atoms such as phthalic acid, isophthalic acid, terephthalic acid, naphthalenedicarboxylic acid or trimellitic acid; and the like.

(vi) Monoamine

Alkylamine having 3 to 25 carbon atoms such as propylamine, butylamine, dibutylamine, hexylamine, octylamine, decylamine, pentadecylamine or stearylamine; alicyclic amine having 5 to 10 carbon atoms such as cyclopentyl amine or cyclohexyl amine; aromatic amine having 6 to 12 carbon atoms such as aniline, toluidine or benzylamine; and the like.

(vii) Polyamine

Aliphatic polyamine having 2 to 10 carbon atoms such as ethylenediamine or diethylenetriamine; aromatic polyamine having 6 to 20 carbon atoms such as phenylenediamine, tolylenediamine or methylenedianiline; and the like.

(viii) Other Starting Materials

Water, ammonia, alkanolamine, urea, melamine, isocyanuric acid, castor oil, hardened castor oil, amino acid compound; and the like.

In the present invention, nonionic surfactant such as polyethylene glycol type surfactant and Pluronic type surfactant are classified not in the group of the following surfactant (F) but in the group of the polyoxyalkylene adduct (D).

(IIb) Carboxyl-containing Compound (E) Carboxylic Acid Compound (E-1) Saturated fatty acid having 6 to 16 carbon atoms such as caproic acid, enanthic acid, caprylic acid, pelargonic acid, undecylic acid, lauric acid, tridecylic acid, myristic acid, pentadecylic acid or palmitic acid; (E-2) unsaturated fatty acid having 11 to 25 carbon atoms such as undecylenic acid, oleic acid, elaidic acid, cetoleic acid, linoleic acid, linolenic acid or stearolic acid; (E-3) dimer acid of unsaturated fatty acid; (E-4) fatty acid obtained from natural fat and oil such as beef tallow; and the like.

(IIc) Other Compounds Having Hydrophilic Group

Compound having both of hydroxyl and carboxyl as the hydrophilic group, compound having oxyethylene group and other hydrophilic group, and the following compounds which cannot be classified in (IIa), (IIb).

(F) Surfactant (F-1) nonionic surfactant such as (F-1a) ester of fatty acid (having 6 to 24 carbon atoms) of polyhydric alcohol such as glycerin, pentaerythritol, sorbitol, sorbitan or sucrose, (F-1b) alkyl (having 6 to 24 carbon atoms) ether of polyhydric alcohol, (F-1c) fatty acid (having 6 to 24 carbon atoms) amide of alkanolamine such as diethanolamine, and (F-1d) fatty acid ester of polyoxyethylenated polyhydric alcohol; (F-2) cationic surfactant of amine salt type, quaternary ammonium type, and the like; (F-3) anionic surfactant such as metallic soap, sulfosuccinate dialkyl ester, sulfonic acid salt such as alkane sulfonate, hydroxyalkane sulfonate, alkylbenzene sulfonate, alkylnaphthalene sulfonate, propylsulfonate of polyoxyethylenated alkyl phenol or sulfophenyl ether salt of polyoxyethylenated hydric alcohol, sulfonated castor oil, sulfuric acid ester salt such as fatty acid alkyl ester, fatty alcohol sulfate, polyoxyethylene alkyl ether sulfate or polyoxyethylene alkyl phenyl ether sulfate, phosphoric acid ester salt such as alkyl phosphate, polyoxyethylene alkyl ether phosphate or polyoxyethylene alkyl phenyl ether phosphate; (F-4) amphoteric surfactant of betaine type such as carboxybetaine or sulfobetaine, amino carboxylic acid type, amino sulfuric acid ester type, imidazoline type, and the like.

(G) Polyester Compound

Compound having at least one hydroxyl group and/or carboxyl group in its molecule which is a condensation reaction product of a compound having alcoholic hydroxyl group such as the above-mentioned (A), (B) or (D) with a compound having carboxylic group such as the above-mentioned (E) and the above-mentioned starting material (v) for (D).

(H) Other Compounds

Modified (etherified, esterified, urethanated or halogenated) compound of the above-mentioned (A) to (G) such as 2,2,4-trimethyl-1,3-pentanediol monoisobutylate, polyether-modified silicone compound, liquid epoxy resin represented by diglycidyl ether of bisphenol A, fat and oil compound such as castor oil, and the like.

A combination of at least two of the above-mentioned compounds can be used.

Among the above-mentioned compounds, the compound (IIa) containing hydroxyl group and the compound (IIb) containing carboxyl group are preferable since a solidified product having a high gelling strength can be obtained. Further, the compounds (A), (C), (D) and (E) are more preferable since a rate of the solidification is high. And, the compound (D) is most preferable from a point of little smell.

In the compound (A), the aliphatic alcohol (A-1) having 8 to 16 carbon atoms is preferable as being relatively cheap and in the compound (A-1), an aliphatic alcohol having 8 to 10 carbon atoms, is further preferable since a solidified product having a higher gelling strength can be obtained.

In the compound (C), the monohydric phenol (C-1) having 8 to 30 carbon atoms is preferable from a point of view of excellent miscibility with the gel forming material (I), and in (C-1), monohydric phenols having 12 to 18 carbon atoms such as octyl phenol, nonyl phenol and nonyl cresol are preferable since a solidified product having a high gelling strength can be obtained.

In the compound (D), a polyethylene glycol type nonionic surfactant such as alkylene oxide(particularly ethylene oxide alone or ethylene oxide/propyrene oxide mixture) adduct with a monohydric alcohol having 4 to 25 carbon atoms, the above-mentioned phenolic compound, a monocarboxylic acid compound having 8 to 25 carbon atoms, an alkylamine compound having 8 to 25 carbon atoms and the like, polypropylene glycol, poly(propylene-ethylene) glycol, polytetramethylene glycol, poly(butylene-ethylene) glycol, polypropylene polyol (having 3 to 8 functional groups), poly(propylene-ethylene) polyol (having 3 to 8 functional groups) are preferable since a solidified product having a high gelling strength can be obtained. Polyethylene glycol and polyethylene polyol (having 3 to 8 functional groups) wherein the whole molecules thereof are hydrophilic (oxyethylene group), are not preferable since not only a solidifying period of time is long, but also it is hard to obtain a homogeneously solidified product. The molecular weight of (D) is usually from about 200 to about 50,000, preferably from about 300 to about 10,000, further preferably from about 400 to about 6,000. If the molecular weight is less than 200, inflammability is increased, and if more than 50,000, miscibility with the gel forming material becomes worse and it is difficult to obtain a solidified product having a high gelling strength.

In (E), the saturated fatty acid (E-1) having 6 to 16 carbon atoms and the unsaturated fatty acid (E-2) having 11 to 25 carbon atoms are preferable, and the saturated fatty acid having 8 to 12 carbon atoms in (E-1) and the unsaturated fatty acid having 11 to 18 carbon atoms in (E-2) are further preferable the melting point of the liquid-oil-solidifying agent (Z) (hereinafter referred to simply as the solidifying agent) is lowered and making the solidifying agent easy to handle.

In the present invention, the solidifying agent (Z), when used, is heated in the state as sealed in the heat-resistive container and then mixed with liquid oils. To carry out the heat treatment of the solidifying agent (Z) and the solidification treatment of the liquid oils more safely, it is preferable that the flashing point of the protective material (II) is higher than the heating temperature of the solidifying agent (Z). As described hereinafter, as means for heating the solidifying agent (Z), a water bath (about 100° C.) or a microwave oven (about 80° to about 160° C.) can be employed advantageously. Therefore, it is preferable that the protective material (II) used in case of the heating by means of the water bath has a flashing point of higher than 100° C. and that the protective material (II) used in case of the heating by means of the microwave oven has a flashing point of higher than 160° C. The compounds having the flashing point higher than 100° C. or than 160° C. among the compounds (A) to (H) are exemplified in TABLE 1. And, in TABLE 1, compounds were specified by the number of carbons or the molecular weight.

TABLE 1

| Temporarily protective material (II) | | Flashing point >100° C. | Flashing point >160° C. |
|---|---|---|---|
| (A) Monohydric alcohol | (A-1) | Compounds having 11 or more carbon atoms | No pertinent compound |
| | (A-2) | Compounds having 8 or more carbon atoms | No pertinent compound |
| | (A-3) | Compounds having 10 or more carbon atoms | No pertinent compound |
| (B) Polyhydric alcohol | (B-1) | Compounds having 4 or more carbon atoms | Compounds having 10 or more carbon atoms |
| | (B-2) | Compounds having 5 or more carbon atoms | Compounds having 10 or more carbon atoms |
| | (B-3) | All of the exemplified compounds | Compounds having 10 or more carbon atoms |
| | (B-4) | All of the exemplified compounds | All of the exemplified compounds |
| (C) Phenolic compound | (C-1) | Compounds having 8 or more carbon atoms | Compounds having 16 or more carbon atoms |
| | (C-2) | All of the exemplified compounds | All of the exemplified compounds |
| (D) Alkylene oxide adduct | (D-1) | Compounds having a molecular weight of 250 or more | Compounds having a molecular weight of 400 or more |
| | (D-2) | Compounds having a molecular weight of 200 or more | Compounds having a molecular weight of 300 or more |
| | (D-3) | Compounds having a molecular weight of 200 or more | Compounds having a molecular weight of 250 or more |
| (E) Carboxylic acid compound | (E-1) | Compounds having 6 or more carbon atoms | No pertinent compound |
| | (E-2) | Compounds having 6 or more carbon atoms | Compounds having 18 or more carbon atoms |
| | (E-3) | All of the exemplified compounds | All of the exemplified compounds |
| | (E-4) | All of the exemplified compounds | All of the exemplified compounds |
| (F) Surfactant | (F-1) | Compounds having a molecular weight of 250 or more | Compound having a molecular weight of 400 or more |
| (G) Polyester compound | (G-1) | Compounds having a molecular weight of 200 or more | Compound having a molecular weight of 300 or more |
| (H) Other compounds | | Compounds having a molecular weight of 250 or more | Compound having a molecular weight of 400 or more |

Also, among the above-exemplified compounds (A) to (H), the compounds which are in the liquid state at ordinary temperature (about 20° C.) are preferable because they lower the melting point of the solidifying agent (Z) and are easy to handle.

The solidifying agent (Z) of the present invention can be obtained by heating and melting the gel-in-oil forming material (I) together with the temporarily protective material (II) (hereinafter referred to as "protective material") to mix uniformly and, then, by cooling after substantially removing substances having a low boiling point. The usage of (I) is usually about 1 or more parts by weight, preferably 2 to 20 parts by weight, further preferably 2.5 to 10 parts by weight based on 100 parts by weight of liquid oils to be treated. When the usage of (I) is less than about 1 part by weight, it becomes difficult to solidify the liquid oils and even if solidified, the oils bleed easily from the solidified product.

In the present invention, the protective material (II) is used with the gel forming material at a specified ratio. Namely, the mixing ratio (weight ratio) of (II)/(I) is usually from 0.5 to 50, preferably from 1 to 20, further preferably from 1 to 10. When the ratio of (II)/(I) is less than 0.5, it is difficult to obtain a homogeneously solidified product and when more than 50, it is uneconomical because an amount of the gel forming material (I) necessary for the solidification-treatment of liquid oils is increased.

In the present invention, in addition to the above-mentioned (I) and (II), additives (III) can be used if necessary. Examples of the additives (III) are, for instance, known gelling strength reinforcing agents such as sodium stearate, sodium salt of carboxymethyl cellulose, sodium polyacrylate, sodium carbonate and calcium hydroxide, coloring agents, antioxidants, ultraviolet ray absorbents, and the like.

Also, in the present invention, to recognize the melting point of the solidifying agent correctly, a thermo-sensitive indicator which changes its hue at a specific temperature can be added to the solidifying agent if necessary. Examples of the thermo-sensitive indicator are, for instance, a combination of a dye (particularly a leuco dye) and a developer (for example, the above-mentioned phenolic compound (C)), which is employed in thermo-sensitive papers or pressure-sensitive papers. Particularly, if the dye is microcapsulated and the obtained microcapsule is so designed that a wall material of the microcapsule is destroyed at a specific temperature, it can be easily performed to heat the solidifying agent up to a desired temperature and melt it only by observing the change of the hue which occurs through the contact of the dye to the developer.

In the present invention, the solidifying agent (Z) is usually prepared by mixing the gel forming material (I), the protecting material (II) and, if necessary, the additive (III), and is preferably prepared by heating and melting those three components and mixing them uniformly, and, further preferably, after mixing, by removing substances having a low boiling point which is lower than 150° C. such as water, by means of a conventional means such as degassing in vacuo, followed by cooling. The reason why the components (I), (II) and, if necessary, (III) are previously heated and mixed uniformly prior to the solidification-treatment of liquid oils is that the melting point of the solidifying agent (Z) becomes lower than that of the gel forming material (I) and the solidifying agent (Z) disperses uniformly in the liquid oils immediately and thus a solidified product having a high gelling strength can be obtained. Also, the reason why the substances having a low boiling point are removed is that as mentioned later, for example, in case where the solidifying agent (Z) sealed in the heat-resistive container such as a retort pouch container is melted by means of the microwave oven (heating by irradiating microwaves), it is important not to cause expansion of the heat-resistive container and further accident of explosion (besides, in case of retort foods, it is not recommended to heat by means of the microwave oven to prevent the accident of explosion because the retort foods contain much water).

Furthermore, since, by removing the substances having the low boiling point, a generation of odor generated when the solidifying agent (Z) is heated and melted can be inhibited and inflammability of (Z) can be lowered, and thus the waste-oil-treatment can be carried out more safely.

The appearance of the so-prepared solidifying agent (Z) is in the paste or solid state at ordinary temperature (about 20°

C.). And, the melting point (solidifying point) of the solidifying agent (Z) differs according to the kinds of the gel forming material (I) and the protective material (II) and usually is not lower than about 35° C. Particularly, in case where the protective material (II) is a liquid compound at ordinary temperature, the melting point of the solidifying agent (Z) is at least about 5° C. lower than that of the gel forming material (I). It is preferable that the melting point of the solidifying agent (Z) is as low as possible because the handling thereof is easy. There is not always a correlation, however, between the melting point of the solidifying agent (Z) and the ease of the solidification-treatment, and the easiness of the solidification-treatment depends mainly on chemical properties of the protective material (II) as described above.

In the present invention, the usage of the solidifying agent (Z) is usually not less than 1.5 parts by weight, preferably 3 to 50 parts by weight, further preferably 3 to 30 parts by weight, particularly preferably 4.5 to 20 parts by weight per 100 parts by weight of the liquid oil. When less than 1.5 parts by weight, it is difficult to solidify the liquid oil.

In the method of the present invention, the solidifying agent (Z) prepared as described above is used in such a way that the solidifying agent (Z) is heated as sealed in the heat-resistive container. As the heat-resistive container, there are a bottle produced from, for example, glass, aluminum, paper, plastics or composite material thereof, a container in the form of pouch made by laminating films, and a tube. Among them, the heat-resistive container made of plastics or plastic composites is preferable in view of price and excellent characteristics such as proccessability and sealing property. The examples thereof are as follows.

(1) Bottle

Bottle produced by plastic-processing a polymer such as polyethylene(PE), polypropylene(PP), crystalline polypropylene(CPP), talc-reinforced polypropylene, ABS resin, PET(polyethylene terephthalate), C-PET(crystalline polyethylene terephthalate), polyamide(PA), polycarbonate (PC) or poly(methyl pentene) (TPX).

(2) Container in the form of pouch

Examples thereof are (L1) a mono-composed film of plastic such as PE, PP, vinylidene chloride (PVDC), PET or PA, (L2) a vacuum-deposited film of those plastics, (L3) a laminated film comprising plural plastic films, (L4) a laminated film comprising a plastic film and a material such as paper, aluminum foil (AL) or ceramic. Examples of L2 are, for instance, aluminum-deposited PET, aluminum-deposited PP, silicon oxide (SiO)-deposited PET or the like. Examples of L3 are, for instance, PVDC/PP, PA/PE, PET/PE, PA/PP, PA/PVDC/PP, PET/PA/PP or the like. Examples of L4 are, for instance, PET/paper, PA/AL/PE, PET/AL/PE, PET/AL/PP, PET/PA/AL/PP or the like.

(3) Tube

Plastic tube (extrusion, blow) of PE, PP, PVDC, PET or saponified ethylene-vinyl acetate copolymer, or a laminated tube which is produced by molding a combination of the plastic film of (2) and the material such as aluminum foil or paper.

Among the heat-resistive containers of (1) to (3), for example, prefered are the container in the form of pouch (2) and the tube (3) each of which is employed as a material of a retort pouch container for food packaging and produced from the plastic mono-composed film such as PP, PET or PA, the laminated film such as PA/PP, PET/PA/PP, PET/AL/PP, PET/PA/AL/PP or PET/paper, and the silicon oxide (SiO)-deposited PET.

When heated by means of the irradiation of microwaves mentioned hereinafter, the heat-resistive container containing a metal such as aluminum as a raw material cannot be used because there is a fear that the container will be scorched or electrical discharge will occur.

In the method of the present invention, as the liquid oils to be solidified, there are edible oils and waste edible oils of vegetable oil, animal oils or the like which are in the form of liquid at ordinary temperature; machine oils and waste oils thereof such as engine oil, transmission oil, gear oil for cars, ships or the like; petroleum such as crude oil, heavy oil, light oil and kerosene and relevant products thereof.

In the present invention, the solidifying agent (Z) sealed in the heat-resistive container is heated as sealed in the container, up to a predetermined temperature lower than the boiling point of the temporarily protective material (II), preferably lower than the flashing point of (II) and melted, and then mixed with the liquid oils. After that, the liquid oils are solidified by allowing the container to stand for a while (5 seconds to 10 minutes, particularly 5 to 120 seconds).

In the method of the present invention, the temperature for treating liquid oils is not particularly limited, and is usually not lower than 5° C., preferably about 10° to about 40° C. As the method of mixing the liquid oils and the solidifying agent (Z), the molten solidifying agent (Z) may be added into the liquid oils and, on the contrary, the liquid oils may be added into the molten solidifying agent (Z). The former method is preferable in such a point that the solidifying agent (Z) is dispersed in the liquid oils uniformly and the homogeneously solidified product can be easily obtained. The method of heating and melting the solidifying agent (Z) is not particularly limited, and there are, for example, a method of heating in a boiling water bath, a method of heating in a steam bath at atmospheric pressure or under pressure, a method of heating by means of a cooking plate, further, a method of heating by irradiating microwaves (about 900 MHz to about 25000 MHz), or the like.

The temperature at which the solidifying agent (Z) as sealed in the container is heated and melted by using the above-mentioned heating method is a temperature lower than the boiling point of the temporarily protective material (II) which is one component of the solidifying agent (Z), and may be determined by considering the flashing point of (Z) or (II) and is usually from 60° to 180° C., preferably from 80° to 180° C., more preferably from 90° to 160° C. In case of lower than 60° C., it is not preferable since it is difficult to solidify the liquid oils homogeneously. In case of higher than 180° C., it is not preferable since raising of the temperature of the liquid oils after the mixing is not negligible, and thus unnecessary time and energy are consumed because time for the solidification (phase transition from liquid phase to solid phase) of the liquid oils becomes long.

The heating temperature in case of the heating means using the hot-water bath is from about 80° C. to about 100° C., preferably about 100° C. The heating temperature in case of the steam bath is from about 100° C. to about 120° C., preferably 100° C. And, the heating temperature in case of the heating by means of an microwave oven is from about 80° C. to about 160° C., preferably from about 80° C. to about 120° C.

In case where the waste oils are treated particularly at general homes, restaurants or the like, the method of heating the solidifying agent (Z) as sealed in the container (particularly a retort pouch container) in the hot-water bath or in the steam bath by means of a household steamer or a pressure cooker and, for example, the method of heating by the irradiation of microwaves by means of a microwave oven are preferable in view of thermal efficiency and simplicity. The former method of heating by means of the hot-water bath or the steam bath is particularly preferable from the following comparison of advantages and disadvantages between both of the methods. Namely, the method of heating by means of the microwave oven, though the operation thereof is easy, is unexpectedly troublesome because it is necessary to change the heating time depending on circumstances in order to surely solidify the liquid oils always in the same way. Further, since a volume capable of being heated is limited, the method of heating by means of the microwave oven is not suitable for business use wherein a large amount of the solidifying agent (Z) is required, namely a large amount of the waste oils should be treated. On the other hand, in the method of heating in the hot-water bath or steam bath, though the method is inferior in heat efficiency, the solidification-treatment of the waste oils can be carried out safely and surely even if a large amount of the solidifying agent (Z) is used because the heating operation thereof is simple and it is possible to always heat up to a specific temperature (about 100° C. under atmospheric pressure), and thus the method is suitable for both of general homes and business uses. Among these, the method of heating in the hot-water bath is most excellent because heat efficiency thereof is superior to that of the heating in the steam bath.

(Method of heating in the hot-water bath or in the steam bath)

1. Advantages

The heating operation is simple.

There is no fear of a fire such as ignition.

The solidifying agent (Z) can be always controlled at a specific temperature (for example, about 100° C.) without heating too high.

After completion of the heating, the solidifying agent (Z) is not easily cooled, and thus there is enough time for the solidification-treatment of liquid oils.

Safe because the solidifying agent (Z) does not come in direct contact with hands.

Suitable also for the heating of a large amount of the solidifying agent (Z).

Actual period of time for heating the solidifying agent (Z) is short, particularly in shops such as restaurants, because boiling water is always ready in their kitchen.

2. Disadvantages

Additional energy and time is necessary for heating water.

Heating temperature is limited to around 100° C.

(Method of heating by irradiation of microwaves)

1. Advantages

Heating operation is easy.

Heat efficiency is good.

2. Disadvantages

It is expected that a user mistakes the heating time, which is much troublesome in the solidification-treatment of liquid oils, because there are available two types of household microwave ovens, i.e. 500 W output type and 600 W output type on the market and accordingly the heating time varies depending on the output of the oven.

It is necessary to change the heating time according to an amount of the solidifying agent (Z) and to master the know-how or operation.

Melting temperature of the solidifying agent (Z) varies day by day even if the same amount of the solidifying agent (Z) is heated for the same period of time, because the melting temperature of the solidifying agent (Z) varies according to season, atmospheric temperature and the like.

It is necessary to carry out the solidification-treatment immediately after the heating and there is no enough time, because the solidifying agent is easily cooled after the heating.

Not preferable for heating and melting a large amount of the solidifying agent (Z) and not suitable for business use.

It is necessary to wash a container after the solidification-treatment of liquid oils because the solidifying agent (Z) is usually heated in the container of glass, pottery or the like.

There is a danger of getting scalded when touching the container if the container is super-heated due to erroneous heating time and, further, there are some cases where the heat-resistive container is deformed or exploded if super-heated in the sealed state.

There is a fear that the inside of the microwave oven is contaminated by volatile components if the solidifying agent is heated with its container being open.

In the present invention, particularly in case where the microwave oven is used as the means for heating the solidifying agent (Z), it is preferable that a thermosensitive indicator (chemicals, hue of which changes according to temperature change) is dissolved in the solidifying agent (Z) or that at least one of the following indications is stamped on the heat-resistive container or that a temperature indicating label is put on the heat-resistive container.

1. Indication of Content

Rough scale which shows a residual amount are indicated on both of upper and lower portions of the heat-resistive container (particularly in case of a plastic bottle or tube for multiple use for solidification-treatments). The amount of the solidifying agent (Z) to be added is easily recognized from the scale.

2. Indication of Heating Time

In order to heat the solidifying agent (Z) up to a desired temperature, it is necessary to change the heating time according to the residual amount of the solidifying agent, and rough scale which shows the heating time required are indicated on the container similarly to the above 1 (it is preferable to provide a couple of separate scales for 500 W and 600 W of output).

3. Indication of Temperature

Crayon, paint or temperature indicating label, the hue of which changes reversibly or irreversibly at an optional temperature of 50° to 200° C. is applied on the surface of the heat-resistive container. The heating is carried out as observing the change of color, and the switch of the microwave oven may be turned off when the predetermined change of color is observed.

As explained above, though the gelling strength of a solidified product, which is obtained when liquid oils are solidified by means of the method of the present invention, varies depending on kind of the liquid oil, the amount of the solidifying agent and conditions of the solidification-treatment, the strength is usually from about 30 g/cm$^2$ to about 1000 g/cm$^2$.

The present invention is explained by means of EXAMPLES and COMPARATIVE EXAMPLES, but is not limited thereto. Part and % represent part by weight and % by weight, respectively.

First, abbreviations and compositions of raw materials used in EXAMPLES and COMPARATIVE EXAMPLES are shown below.

1. Gel forming material (I)
   (1) 12-HS: 12-hydroxystearic acid
2. Temporarily protective material (II)
   (1) DCA: n-decanol
   (2) NPH: nonylphenol
   (3) BP-A: bisphenol A
   (4) E-HA: 2-ethylhexanoic acid
   (5) OLA: oleic acid
   (6) Polyether A: about 10% ethylene oxide adduct (hydroxyl value: 112) of polypropylene glycol (hydroxyl value: 125)
   (7) Polyether B: polypropylene glycol (hydroxyl value: 280)
   (8) Polyether C: propylene oxide adduct (hydroxyl value: 420) of triethanolamine
   (9) Polyether D: adduct which is obtained by adding a mixture (mole ratio: 4/1) of propylene oxide and ethylene oxide to pentaerythritol (hydroxyl value: 75) and, further, by adding ethylene oxide (hydroxyl value: 55)
   (10) Nonion A: 5 moles of ethylene oxide adduct of octylphenol
   (11) Nonion B: 8 moles of ethylene oxide adduct of lauryl alcohol
   (12) Nonion C: 20 moles of ethylene oxide adduct of sorbitan monooleic acid ester
   (13) CAS: castor oil
3. Additive
   (1) CMC: sodium salt of carboxymethyl cellulose produced by Wako Pure Chemical Industries, Ltd.
4. Thermosensitive indicator: mixture of 1 part of crystal violet lactone, 1 part of tertiary-butylcatechol, 3 parts of n-docosyl alcohol, which changes its color from blue to colorless at about 100° C.
5. Temperature indicating label
   (1) Temperature indicating label A: Thermolabel LI-150 (trade name of Nichiyu Giken Kogyo Kabushiki Kaisha, completely irreversible)
   (2) Temperature indicating label B: Thermolabel Mini No. 120 (trade name of Nichiyu Giken Kogyo Kabushiki Kaisha, completely irreversible)
   (3) Temperature indicating label C: Thermolabel 3E-160 (trade name of Nichiyu Giken Kogyo Kabushiki Kaisha, completely irreversible)
6. Liquid oil
   (1) Edible oil: salad oil (mixture of rapeseed oil and soybean oil) produced by AJINOMOTO CO., INC.
   (2) Waste edible oil: thermally deteriorated (viscosity and hue increased) waste oil collected after the above-mentioned edible oil was used to cook a deep-fried food five times.
   (3) Waste engine oil: waste engine oil of TOYOTA Castle Motor Oil Clean SG10W-30 collected from a car after running about 3,500 km.
   (4) Kerosine: white kerosine The raw materials used in EXAMPLES and COMPARATIVE EXAMPLES and the method for measuring properties of the obtained solidified product of liquid oils are shown below.
1. Hydroxyl value
   A method which is specified in JIS K0070.
   In case of a polyhydroxy compound, a molecular weight (number average molecular weight) can be obtained from the hydroxyl value. Namely, number average molecular weight=average number of functional group×56,100/hydroxyl value.
2. Melting point (solidifying point)
   Micro melting Point Apparatus produced by Yonagimoto Seisakusyo Kabushiki Kaisha.
3. Setting time
   A period of time until a liquid oil hardly shows its fluidity from the beginning of agitation, after the solidifying agent is introduced into the liquid oil.
4. Gelling strength
   The sample of the solidified product obtained by solidifying 100 g of a liquid oil in a 200 ml plastic container is preserved in an atmosphere of 15° C. for 15 hours. And then, a compression test (compression at a rate of 20 mm/min for one minute) was carried out by Instron-type testing machine using a rod of 25 mm in diameter. The gelling strength is given from the obtained maximum load. The unit is $g/cm^2$.

PREPARATION EXAMPLE 1

(Preparation of Solidifying Agent Z1)

After weighing 400 g of NPH and 400 g of 12-HS into a one-liter glass flask, they were heated and mixed at 80° to 90° C. and, then, low volatile substances were removed through a reduced pressure method to give Solidifying Agent Z1 (melting point: about 50° C.). An amount of 52 g of the obtained Solidifying Agent Z1 was sealed in a retort container in the form of pouch (which is the same as one for retort pouch foods) of a heat resistive PET/AL/CPP film (after sealing, there is no need of sterilizing under pressure at a high temperature since Solidifying Agent Z1 is not a food).

PREPARATION EXAMPLE 2

(Preparation of Solidifying Agent Z2)

Using 750 g of Polyether A and 150 g of 12-HS, Solidifying Agent Z2 (melting point: about 47° C.) was obtained by the same manner as of PREPARATION EXAMPLE 1. Then, 92 g of the obtained Solidifying Agent Z2 was sealed in a PET/AL/PE retort container.

PREPARATION EXAMPLE 3

(Preparation of Solidifying Agent Z3)

After weighing 500 g of CAS and 250 g of 12-HS into a one-liter glass flask, they were heated and mixed at 80° to 90° C. to obtain Solidifying Agent Z3 (melting point: about 60° C.). Then, Solidifying Agent Z3 was sealed in a PET bottle with a handle and a scale for indicating content.

PREPARATION EXAMPLE 4

(Preparation of Solidifying Agent Z4)

Using 300 g of E-HA, 300 g of 12-HS and 0.5 g of Thermosensitive indicator, Solidifying Agent Z4 (melting point: about 45° C.) of blue color was obtained by the same manner as of PREPARATION EXAMPLE 1. Then, Solidifying Agent Z4 was sealed in a PP bottle with a scale for content and a scale for heating time (500 W and 600 W).

EXAMPLE 1

Into a one-liter plastic container, 500 g of the edible oil (about 25° C.) was charged and, after Solidifying Agent Z1 (52 g) of PREPARATION EXAMPLE 1 sealed in the retort container was heated and melted in a hot-water bath of about 100° C. for five minutes, the retort container was opened and the whole amount of Solidifying Agent Z1 was added immediately into the edible oil and then agitated. The edible oil was solidified in about six seconds after the addition and the fluidity of the system completely disappeared.

COMPARATIVE EXAMPLE 1

26 Grams of 12-HS, which was the same amount as in EXAMPLE 1, was heated up to about 100° C. and melted and, then, added to the edible oil instead of Solidifying Agent Z1, and the same manner as in EXAMPLE 1 was repeated. The edible oil was solidified only partially (so-called in the form of small lumps of disorderly solidified oil) and was flowable, and the system could not be solidified homogeneously.

EXAMPLE 2

Solidifying Agent Z2 (92 g) of PREPARATION EXAMPLE 2 sealed in a retort container was boiled in a hot-water bath for about 5 minutes. Then, the whole amount of Solidifying Agent Z2 was added into 500 g of a waste edible oil (about 25° C.) and then agitated for 30 seconds. The whole system was solidified homogeneously after about 120 seconds from the beginning of the mixing.

COMPARATIVE EXAMPLE 2

After 500 g of the same waste edible oil (about 25° C.) as in EXAMPLE 2 was heated up to about 100° C. in a frying pan, 15 g of 12-HS was added thereto and agitated to mix uniformly. The mixture was allowed to stand as it was in a room, and about 20 minutes later, the system was barely solidified homogeneously.

EXAMPLE 3

Temperature indicating label A (changing its color from white to black irreversibly at 150° C.) was adhered to the surface of the container of Solidifying Agent Z3 of PREPARATION EXAMPLE 3, and the container was heated by means of a microwave oven (output of 600 W, oscillation frequency of 2,450 MHz). The microwave oven was turned off when the color of Thermolabel changed to black. Then, about 75 g of the molten Solidifying Agent Z3 was immediately added into a waste milk package of paper which contained 500 g of a waste edible oil (about 25° C.) and mixed vigorously for about 20 seconds by means of two stirring rods, and the whole system was solidified homogeneously in about 25 seconds.

EXAMPLE 4

A polyethylene film pouch was provided inside a four-liter plastic container. The container was charged with 2000 g of a waste engine oil (about 35° C.) which was a half amount of the waste engine oil drawn out from an engine of a car. After adhering Temperature indicating label B (changing its color from white to black irreversibly at 120° C.) to a surface of a retort container of silica-deposited PET film in which 300 g of Solidifying Agent Z1 prepared in PREPARATION EXAMPLE 1 was sealed, the retort container was heated by means of a microwave oven(output of 600 W, oscillation frequency of 2,450 MHz) until the color of Thermolabel changed. Solidifying Agent Z1 was then poured into the waste engine oil immediately and mixed vigorously for about 10 seconds by means of two stirring rods. The whole system was solidified homogeneously within about 15 seconds from the beginning of the mixing. In the same manner, about 2,000 g of the remaining waste engine oil was solidification-treated.

EXAMPLE 5

Solidifying Agent Z4 prepared in PREPARATION EXAMPLE 4 was heated by a microwave oven (output of 600 W, oscillation frequency of 2,450 MHz) until the hue of Solidifying Agent Z4 changed from blue to colorless (about 100° C.). Then, 9 g of Solidifying Agent Z4 was poured into 500 g of the waste edible oil (about 25° C.) in a waste milk package of paper, followed by stirring for 30 seconds. Then, the oil was allowed to stand for about 90 seconds, however, they were still flowable and were not solidified sufficiently. Then, when further 26 g of Solidifying Agent Z4 heated up to about 100° C. in the same manner was added into the waste edible oil and they were stirred and mixed, the whole system was solidified homogeneously in about 30 seconds.

EXAMPLE 6

The same procedures as in EXAMPLE 1 were repeated by using the same amount of kerosine (about 25° C.) instead of the edible oil. The system was solidified homogeneously in about 20 seconds.

The results of measuring the setting time and gelling strength of the obtained solidified products of EXAMPLES 1 to 6 and COMPARATIVE EXAMPLES 1 and 2 are shown in Table 2.

TABLE 2

|  | Setting time (seconds) | Gelling strength (g/cm$^2$) |
| --- | --- | --- |
| Ex. 1 | 6 | 210 |
| Ex. 2 | 120 | 390 |
| Ex. 3 | 25 | 180 |
| Ex. 4 | 15 | 120 |
| Ex. 5 | 120 + 30 | 145 |
| Ex. 6 | 20 | 100 |
| Com. Ex. 1 | not set | — |
| Com. Ex. 2 | 1,200 | 410 |

EXAMPLES 7 to 15

The solidifying agent, which was heated, melted and adjusted to a given temperature by using the heating method described in TABLE 3, was added into a polypropylene container which contained 500 parts of the waste edible oil (about 20° C.), and then immediately mixed vigorously for 10 seconds. Then the oil was allowed to stand to give a solidified product. The setting time and gelling strength of each example are shown in TABLE 3.

TABLE 3

| EXAMPLE | 7 | 8 | 9 | 10 | 11 | 12 | 13 | 14 | 15 |
|---|---|---|---|---|---|---|---|---|---|
| Solidifying agent (parts) | | | | | | | | | |
| 12-HS | 10 | 10 | 20 | 15 | 8.5 | 15 | 15 | 25 | 125 |
| DCA | | | | | 21.5 | | | | |
| BP-A | | | | | | | | 50 | |
| OLA | 30 | | | | | | | | |
| Polyether B | | 20 | | | | | | | |
| Polyether C | | | | | | | | 15 | |
| Polyether D | | | 20 | | | | | | |
| Nonion A | | | 20 | | | | | | |
| Nonion B | | | | 30 | | | | | |
| Nonion C | | | | | | 30 | | | 30 |
| CAS | | | | | | | | 15 | 30 |
| CMC | | | | | 2.5 | | | | |
| Heat-resistive container | 1 | 1 | 1 | 1 | 2 | 2 | 3 | 4 | 4 |
| Method for heating the solidifying agent | hot-water bath | hot-water bath | hot-water bath | steam bath | microwave oven | microwave oven | microwave oven | Cooking plate | Cooking plate |
| Temperature of the solidifying agent (°C.) | 100 | 100 | 100 | 100 | 120 | 120 | 150 | 160 | 180 |
| Waste edible oil (parts) | 500 | 500 | 500 | 500 | 500 | 500 | 500 | 500 | 500 |
| Setting time (seconds) | 30 | 60 | 80 | 15 | 240 | 120 | 180 | 15 | 360 |
| Gelling strength (g/cm²) | 150 | 80 | 70 | 180 | 60 | 90 | 210 | 670 | 270 |

(Note) The temperatures of the waste edible oils of EXAMPLES 14 and 15 were about 10° C.
Heat-resistive vessel 1: A retort container in the form of pouch of PET/AL/PP films
Heat-resistive vessel 2: PET bottle (with scales for content and heating time by a microwave oven)
Heat-resistive vessel 3: PET bottle (with a scale of content and Temperature indicating label B)
Heat-resistive vessel 4: Aluminium tube (with a scale of content and Temperature indicating label C)

When only the gel forming material was heated and melted and was added to the edible oil of ordinary temperature (about 20° C.), the oil became in the form of disorderly solidified small lumps and no homogeneously solidified product could be obtained (COMPARATIVE EXAMPLE 1). On the other hand, when the liquid oil was solidification-treated according to the method of the present invention by using the solidifying agent comprising the same amount of the gel forming material and the protective material thereof (EXAMPLE 1), a solidified product having a high gelling strength could be obtained in a short time (about six seconds).

As shown in COMPARATIVE EXAMPLE 2, when the waste edible oil was solidification-treated by heating the oil according to the above-mentioned conventional methods (1) to (3), it took about 20 minutes for the waste edible oil to set. On the contrary, when the solidification-treatment was carried out by using the solidifying agent containing the same amount of the gel forming material (EXAMPLE 2), the liquid oil could be set homogeneously within about one-tenth of the time needed in the conventional methods.

As is evident from EXAMPLES 1 to 15, as the means to heat and melt the solidifying agent (Z), hot-water bath, steam bath, microwaves irradiating heating apparatus (microwave oven) and cooking plate can be used. Each of those cooking utensils and devices is used in general homes, restaurants and the like routinely. Particularly in case of heating by means of the microwave oven, the melting temperature of the solidifying agent (Z) can be controlled approximately constant by providing, on the heat-resistive container for the solidifying agent (Z), at least one of an indication of scale for content, an indication of scale for heating time which varies according to the content or an indication utilizing the reversible or irreversible change of the hue, or by previously adding the thermosensitive indicator to the solidifying agent, and thus the solidification-treatment of the liquid oils such as waste edible oil and waste engine oil can be carried out easily and surely like the method of heating by means of hot-water bath or steam bath.

In the conventional methods of heating the liquid oil, when an amount of the gel forming material is not enough and the setting proceeds inadequately, it is necessary to heat again the liquid oil up to a high temperature (not less than the melting point of the gel forming material) and to introduce the gel forming material additionally thereto. In the method of the present invention, however, it is not necessary to heat the liquid oil and it is sufficient only to additionally introduce a small amount of heated and melted solidifying agent into the oil.

Also, a natural oil and fat and a higher fatty acid are used as the protective material (II) for the gel forming material (I) in EXAMPLES 3 and 5 respectively, and do not prevent recycling use of the obtained solidified product as the powdered soap (alkaline metal salt of higher fatty acid).

EXAMPLE 6 shows that even kerosine, the viscosity of which is lower than that of the edible oil, the engine oil and the like, can be solidified. This shows that the solidifying agent of the present invention can be used as the solidifying agent for petroleum products such as crude oil, heavy oil, light oil, petroleum and the like as well as for the edible oil and engine oil.

EXAMPLES 7 to 15 (refer to TABLE 3) show that various compounds can be used widely as the protective agent (II) for the gel forming material (I) and that various methods of the solidification-treatment can be widely selected in accordance with type, application and the like of the liquid oil in the present invention. Therefore, the solidification-treating method of the present invention has superior utilization in industries.

INDUSTRIAL APPLICABILITY

The method of the present invention has the following advantages since not only there is no need of heating the liquid oil but also the liquid oil can be solidification-treated safely in a very short period of time.

(1) In the present invention, there is no need to heat the liquid oil, which means energy saving and assures that there is a very low possibility of a fire caused by oil and also there is no generation of smoke and bad smell caused by heating the waste oil. Since the solidifying agent is heated and melted as sealed in a heat-resistive container, there is no fear that the solidifying agent will ignite during the heating and the bad smell does not leak out. The solidification-treatment of the liquid oil can be carried out by using a plastic container or a paper container such as a used milk package of paper. And, the solidified product can be disposed together with the container as combustible trash after the treatment of the waste oil.

(2) Since it is not necessary to use the cooking utensil such as a frying pan for heating the liquid oil, the solidification-treatment of the waste edible oil can be carried out safely without fear of the gel forming material being mixed into a food through the frying pan. Further, because there is no possibility that a fire caused by oil occurs, it is also possible to carry out the solidification-treatment of a large amount of the waste engine oil at general homes.

(3) Since in the conventional method of heating the liquid oil it takes about 20 minutes to about 50 minutes until the liquid oil is solidified, it can be conjectured that there are many cases where at the time of busy preparing for meal, a part of the generated waste edible oil is not solidified and is thrown from a home into a drain, resulting in pollution of rivers. According to the present invention, the liquid oil can be solidified efficiently in the shortest period of time of about five seconds and therefore, the amount of the waste edible oil being thrown into a drain for the above-mentioned reason can be decreased to contribute to a purification of water quality in rivers.

(4) In case that the amount of the solidifying agent for solidifying the liquid oil is not enough and thus the liquid oil is not solidified sufficiently, it is necessary to heat the liquid oil again in the conventional method of heating the liquid oil. In the present invention, it is not necessary, however, to heat the liquid oil and a small amount of the molten solidifying agent may be added and, further mixed, and thus re-solidification can be carried out easily in a short period of time.

(5) In the method of the present invention, since it is not necessary to pour the solidifying agent to another container and the solidifying agent is heated as sealed in the heat-resistive container, the washing of the used container is not necessary.

(6) Also, as the heat-resistive container, for example, a retort container (in the form of pouch), a heat-resistive plastic bottle or tube which is used for food packagings can be employed. Therefore, as the means for heating and melting the solidifying agent which is sealed in the heat-resistive container, the method for heating in a hot-water bath or a steam bath or the method of heating by means of irradiation of microwaves (microwave oven) can be employed. Accordingly, even a housewife can achieve solidification-treatment of the liquid oil simply, safely and speedily.

(7) Further, by providing, on the surface of the heat-resistive container, at least one of an indication of a scale for content, an indication of a scale for heating time in case of the microwave oven which need be varied according to the content, or an indication utilizing the reversible or irreversible change of the hue, or by previously adding a thermosensitive indicator to the solidifying agent, the solidification-treatment of the liquid oil can be carried out surely even in the heating by means of the microwave oven which needs know-how such as controlling of the heating time, like the heating method by means of a hot-water bath or a steam bath.

(8) The method of the present invention is useful not only for the solidification-treatment of waste oil such as waste edible oil and waste engine oil but also for other uses, for example, in preparation of solid fuel since the setting time of liquid oil, since gelling strength of the obtained solidified product and the like can be varied broadly.

We claim:

1. A method of solidifying a liquid oil, comprising heating a solidifying agent (Z) for liquid oil which comprises a gel-in-oil forming material (I) and a temporarily protective material (II) for the forming material (I), and being sealed in a heat-resistive container during heating, and mixing all or a part of the molten solidifying agent (Z) for liquid oil with the liquid oil without heating the liquid oil so as to solidify the liquid oil, said forming material (I) is solid state at ordinary temperature and is at least one selected from the group consisting of hydroxyl fatty acid having 16 to 30 carbon atoms, dibenzylidene sorbitol, lauroylglutamic acid dibutylamide and dicaproyllisine laurylamide, said temporarily protective material (II) is liquid state at ordinary temperature and is an organic compound having miscibility with the forming material (I) in the molten state and has a hydrophobic group and a hydrophilic group in its molecule and further has a flashing point of higher than 160° C., and said solidifying agent (Z) does essentially not contain substances having a boiling point of lower than 150° C.

2. The method of claim 1, wherein said gel-in-oil forming material (I) is 12-hydroxystearic acid and said hydrophilic group is at least one selected from the group consisting of hydroxyl, carboxyl and oxyethylene.

3. The method of claim 1 or 2, wherein said temporarily protective material (II) is an alkylene having 2 to 4 carbon atoms oxide adduct of an active hydrogen-containing compound having in its molecule at least one functional group selected from the group consisting of hydroxyl, carboxyl, primary amino group, secondary amino group, and amide.

4. The method of claim 1 or 2, wherein said temporarily protective material (II) is at least one having a molecular weight of about 200 to 50000 selected from the group consisting of a polyethylene glycol type nonionic surfactant, polypropylene glycol, poly(propylene-ethylene)glycol, polytetramethylene glycol, poly(butylene-ethylene)glycol, polypropylene polyol having 3 to 8 functional groups and poly(propylene-ethylene) polyol having 3 to 8 functional groups.

5. The method of claim 1 or 2, wherein a mixing ratio (weight ratio) of (II)/(1) is from 0.5 to 50.

6. The method of claim 1 or 2, wherein the liquid oil is solidified by mixing 3 to 50 parts by weight of the molten solidifying agent (Z) of 80° to 180° C. and 100 parts by weight of the liquid oil.

7. The method of claim 1 or 2, wherein the solidifying agent (Z) sealed in a heat-resistive container of a retort pouch container, a heat-resistive plastic bottle or a heat-resistive plastic tube is heated and melted as sealed therein in a hot-water bath or a steam bath and then mixed with the liquid oil.

8. The method of claim 1 or 2, wherein the solidifying agent (Z) containing a thermosensitive indicator which causes reversible or irreversible change of its hue with temperature change is heated and melted through irradiation of microwaves and then mixed with the liquid oil.

9. The method of claim 1 or 2, wherein the solidifying agent (Z) sealed in a heat-resistive container of a retort pouch container, a heat-resistive plastic bottle or a heat-resistive plastic tube, on a surface of which a thermosensitive portion which generates reversible or irreversible change of a hue with temperature change is provided, is heated and method through irradiation of microwaves and then mixed with the liquid oil.

10. A method of solidifying a liquid oil, comprising heating a solidifying agent (Z) for liquid oil which comprises a gel-in-oil forming material (I) and a temporarily protective material (II) for the forming material (I), and being sealed in a heat-resistive container during heating, and mixing all or a part of the molten solidifying agent (Z) for liquid oil with the liquid oil without heating the liquid oil so as to solidify the liquid oil, a temperature for treating the liquid oil is from 10° C. to 40° C., said forming material (I) is solid state at ordinary temperature and is at least one selected from the group consisting of hydroxyl fatty acid having 16 to 30 carbon atoms, dibenzylidene sorbitol, lauroylglutamic acid dibutylamide and dicaproyllisine laurylamide, said temporarily protective material (II) is liquid state at ordinary temperature and is an organic compound having miscibility with the forming material (I) in the molten state and has a hydrophobic group and a hydrophilic group in its molecule and further has a flashing point of higher than 160° C., and said solidifying agent (Z) does essentially not contain substances having a boiling point of lower than 150° C.

11. The method of claim 10, wherein the-solidifying agent (Z) sealed in a heat-resistive container of a retort pouch container, a heat-resistive plastic bottle or a heat-resistive plastic tube is heated and melted as sealed therein in a hot-water bath or a steam bath and then mixed with the liquid oil.

12. The method of claim 10, herein the solidifying agent (Z) containing a thermosensitive indicator which causes reversible or irreversible change of its hue with temperature change is heated and melted through irradiation of microwaves and then mixed with the liquid oil.

13. The method of claim 10, wherein the solidifying agent (Z) sealed in a heat-resistive container of a retort pouch container, a heat-resistive plastic bottle or a heat-resistive plastic tube, on a surface of which a thermosensitive portion which generates reversible or irreversible change of a hue with temperature change is provided, is heated and melted through irradiation of microwaves and then mixed with the liquid oil.

14. A method of solidifying a waste edible oil, comprising heating a solidifying agent (Z) for waste edible oil which comprises a gel-in-oil forming material (I) and a temporarily protective material (II) for the forming material (I), and being sealed in a heat resistive container during heating, and mixing all or a part of the molten solidifying agent (Z) for waste edible oil with the waste edible oil without heating the waste edible oil so as to solidifying the waste edible oil, said forming material (I) is solid state at ordinary temperature and is at least one selected from the group consisting of hydroxyl fatty acid having 16 to 30 carbon atoms; dibenzylidehe sorbitol, lauroylglutamic acid dibutylamide and dicaproyllisine laurylamide, said temporarily protective material (II) is liquid state at ordinary temperature and is an organic compound having miscibility with the forming material (I) in the molten state and has a hydrophobic group and a hydrophilic group in its molecule and further has a flashing point of higher than 160° C., and said solidifying agent (Z) does essentially not contain substances having a boiling point of lower than 150° C.

15. The method of claim 14, wherein the solidifying agent (Z) sealed in a heat-resistive container of a retort pouch container, a heat-resistive plastic bottle or a heat-resistive plastic tube is heated and melted as sealed therein in a hot-water bath or a steam bath and then mixed with the liquid oil.

16. The method of claim 14, wherein the solidifying agent (Z) containing a thermosensitive indicator which causes reversible or irreversible change of its hue with temperature change is heated and melted through irradiation of microwaves and then mixed with the waste edible oil.

17. The method of claim 14, wherein the solidifying agent (Z) sealed in a heat-resistive container of a retort pouch container, a heat-resistive plastic bottle or a heat-resistive plastic tube, on a surface of which a thermosensitive portion which generates reversible or irreversible change of a hue with temperature change is provided, is heated and melted through irradiation of microwaves and then mixed with the waste edible oil.

* * * * *